US010318660B2

(12) United States Patent
Choudhary et al.

(10) Patent No.: US 10,318,660 B2
(45) Date of Patent: Jun. 11, 2019

(54) METHOD AND APPARATUS FOR AUTOMATICALLY CREATING A DRAINAGE SYSTEM ALONG A ROAD NETWORK IN A BUILDING INFORMATION MODEL (BIM) COMPUTER AIDED DESIGN (CAD) THREE-DIMENSIONAL (3D) MODEL

(71) Applicant: Autodesk, Inc., San Rafael, CA (US)

(72) Inventors: Gunjan Choudhary, Nashua, NH (US); Sarah M. Cunningham, Charlestown, MA (US); Chun-Wang Ng, Bedford, NH (US); Charles R. Ogden, Londonderry, NH (US)

(73) Assignee: AUTODESK, INC., San Rafael, CA (US)

( * ) Notice: Subject to any disclaimer, the term of this patent is extended or adjusted under 35 U.S.C. 154(b) by 371 days.

(21) Appl. No.: 15/200,917

(22) Filed: Jul. 1, 2016

(65) Prior Publication Data
US 2017/0004230 A1 Jan. 5, 2017

Related U.S. Application Data

(60) Provisional application No. 62/188,230, filed on Jul. 2, 2015.

(51) Int. Cl.
*G06F 17/50* (2006.01)

(52) U.S. Cl.
CPC ...... *G06F 17/5004* (2013.01); *G06F 2217/04* (2013.01)

(58) Field of Classification Search
None
See application file for complete search history.

(56) References Cited

U.S. PATENT DOCUMENTS

2007/0168923 A1* 7/2007 Connor et al.

* cited by examiner

*Primary Examiner* — Syed A Roni
(74) *Attorney, Agent, or Firm* — Gates & Cooper LLP (57) ABSTRACT

A method, system, apparatus, and computer program products provides the ability to define and generate a drainage system along a road network in a building information model (BIM) computer aided design (CAD) three dimensional (3D) model. The road network is acquired and includes a network of roads, geometry of the roads, centerlines for the roads, curbs along the roads, and surrounding conditions. User configurable rules/settings are acquired for automated placement of drainage components along the road. The rules/settings are applied to the road network to automatically design and define the drainage system. The drainage system includes multiple drainage system components and is based on the geometry, centerlines, curbs, and surrounding conditions. The components affect a location and a placement of other components. The drainage system is automatically designed dynamically without additional user input.

22 Claims, 11 Drawing Sheets

METHOD AND APPARATUS FOR AUTOMATICALLY CREATING A DRAINAGE SYSTEM ALONG A ROAD NETWORK IN A BUILDING INFORMATION MODEL (BIM) COMPUTER AIDED DESIGN (CAD) THREE-DIMENSIONAL (3D) MODEL

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/188,230, filed on Jul. 2, 2015, with inventor(s) Gunjan Choudhary, Sarah M. Cunningham, Chun-Wang Ng, and Charles R. Ogden, entitled "METHOD AND APPARATUS FOR AUTOMATICALLY CREATING A DRAINAGE SYSTEM ALONG A ROAD NETWORK IN A BUILDING INFORMATION MODEL (BIM) COMPUTER AIDED DESIGN (CAD) THREE-DIMENSIONAL (3D) MODEL".

BACKGROUND OF THE INVENTION

1. Field of the Invention

The present invention relates generally to building information models, and in particular, to a method, apparatus, and article of manufacture for automatically creating a drainage system along a road network in a building information model (BIM) computer aided design (CAD) three-dimensional (3D) model.

2. Description of the Related Art

There are multiple solutions available that allow civil engineers to add a drainage system along a road network in various CAD software packages. These solutions require the users to digitize points in a three dimensional model or two dimensional model to specify drainage components, location, and geometry. Examples of drainage components include pipelines, inlets, manholes, culverts (e.g., a tunnel carrying a stream or open drain under a road/railroad), outfalls (e.g., the place where a river, drain, or sewer empties into the sea, a river, or a lake) and ponds but are not limited to this list. While manually digitizing the location and geometry of the drainage components provides more control to the user, it is difficult and time consuming for a large scale project.

Imagine a road that is two (2) miles long with inlets and manholes spaced every 300 feet. It could require selecting one-hundred seventy-five (175) points to create this network in the model. The user would locate each of the thirty-five (35) manholes and then pick those locations in the model. The user would then locate each of the seventy (70) inlets, pick those locations, and then connect each inlet to a manhole with a pipe for a total of one-hundred and seventy-five (175) points selected. Furthermore, placing the drainage components is controlled by more than merely specifying a set separation distance (e.g., every three-hundred [300] feet) between components. Instead, the user would first locate low points in the road, place inlets at those locations, and then space additional inlets up to the high points along the road. The numbers stated above are just limited to inlets and manholes. Additional drainage components such as a culvert at a water body crossing (stream, river, ditch, etc.) or an outfall would involve additional manual efforts (e.g., user selections/clicks). For example, the location for the outfall of a system needs to be determined and another component is placed there. Now imagine if this road has four (4) curbs and one needs to add inlets along all curbs. In such a situation, the number of clicks would be roughly doubled. Next imagine if a user is required to make multiple iterations of the design along the road.

At any point in the design process, additional information may require the designer to reevaluate and redo parts of the design or start over. Hence, what is needed is the ability to automate the designing of a complete drainage system along a road network. Such an automated design process needs to create different drainage components along the road network based on individual road geometries and their surrounding conditions.

To better understand the problems of the prior art, a description of prior art utility network and water network creation/visualization systems may be useful. Prior art solutions offer manual digitizing and layout functionality for drainage components in which a user has to pick every single point that defines the drainage components location and/or geometry. As stated above, the user has to manually inspect the road network, its surroundings, and find the intersections with water bodies before modeling drainage. As an example, in the AUTOCAD CIVIL 3D™ product, there is functionality to convert an alignment to a drainage network. However, such an offering lacks in the following areas:

(a) It does not have configurable parameters for automatic placement of drainage components relative to the road geometry. Instead, structures are created at each vertex of the alignment geometry with pipes between them;

(b) It works on the road 2D alignment geometry and does not consider road width, cross slope and curb lines;

(c) It builds only the main line or the trunk line of the drainage system and does not include laterals for inlets;

(d) Outfall locations are not identified; and (e) Storage components like ponds are not designed;

The BENTLEY INROADS™ product allows users to create multiple drainage junctions between two stations on a road while applying a fixed spacing and offset as well as a slope for connected piping. However, BENTLEY's product still requires the user to determine where the starting and ending points are located. Further, BENTLEY's method is performed in a 2D model without any real connection to the road to intelligently determine locations based on geometry. This means that BENTLEY's method cannot smartly determine the offset to the curb, let alone change the offset when the curb gets closer or further from the centerline. In addition, BENTLEY's method does not look at the road's elevation or slope to determine the slope of the pipes or ensure they are placed at an elevation that provides adequate depth of soil cover.

The XPSITE3D™ product is a 3D visual application for designing roads and sites. The XPSITE3D™ product has some automated functionality for roads, intersections and roundabouts, but fails to provide automated drainage design functionality.

In view of the above, what is needed is a system that enables the automated design and configuration of a drainage system/network that considers all relevant factors upon which the drainage system is dependent.

SUMMARY OF THE INVENTION

Today's fast paced environment requires quick results and decision making. Embodiments of the present invention are directed to automating the designing of a drainage system along a road network in a BIM 3D model, based on the geometry of the road network and its surrounding conditions in a dynamic manner.

Accordingly, embodiments of present invention may provide one of more of the following attributes:

1. Complete automation of an otherwise mundane and daunting design process of a holistic drainage system for a road network;
2. User configurable rules for controlling placement of the drainage components relative to each other and to the road geometry;
3. Provides suggestions for design elements such as the outfall locations of the drainage system; and
4. Calculates and suggests a pond location and approximate sizing.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
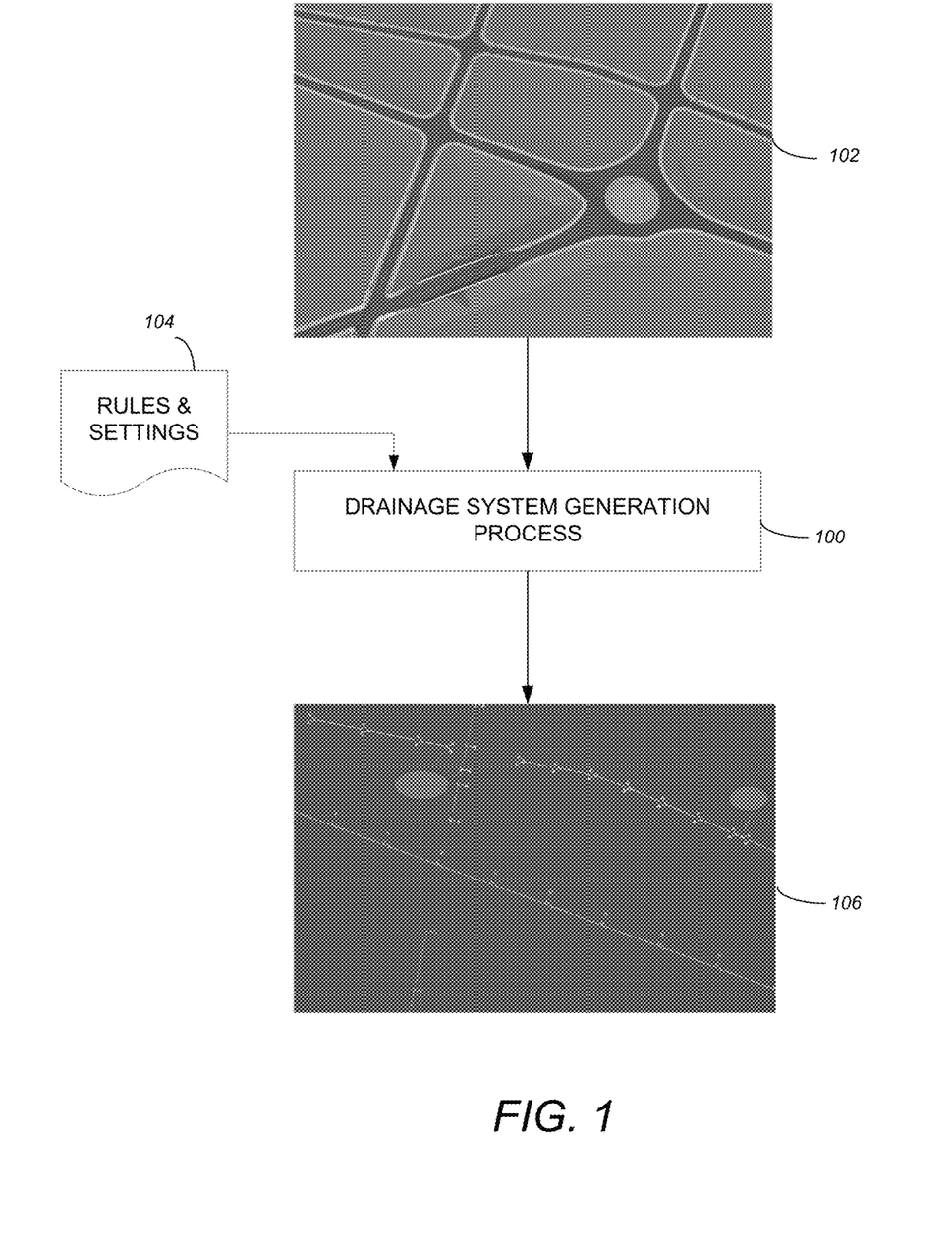
FIG. 1 is a high level block diagram showing the input and output of the entire drainage network generation process in accordance with one or more embodiments of the invention.

FIG. 1 is a high level block diagram showing the input and output of the entire drainage network generation process in accordance with one or more embodiments of the invention. One input to the process 100 is a computer-aided road network in a building information model (BIM) CAD model 102. Such a road network 102 includes (or detects during input) road network centerlines, curbs along the roads that comprise the road network, and the surrounding conditions. In other words, the input 102 is a model with a network of roads. Thus, the road network is first acquired/obtained (e.g., received/retrieved such as from across a network, created by a user, etc.).

A second input to the process are the user configurable rules and settings 104 for placement of drainage components along the roads. Such rules/settings that are acquired by the system provide parameters for automatically designing and defining the drainage system Accordingly, the drainage system generation process 100 leverages the rules and settings 104 and applies the common drainage rules to output a complete drainage system generated in a BIM CAD model 106. Thus, the output is the drainage system/network (e.g., beneath the roads)—the network of multiple drainage system components that takes away the rainfall to keep the roads dry and safe. In embodiments of the invention, drainage system components (e.g., a first drainage system component) may affect a location and placement of other drainage system components (e.g., a second drainage system component).

As only an example and a minimum, embodiments of the invention help create and compare design alternatives for a drainage system as a whole along a road network. Embodiments of the invention provide a significant expansion of the techniques and processes that the industry follows today. Further, the drainage system (that is automatically designed dynamically without additional user input) is based on the geometry of the road network, the centerlines for the roads, the curbs along the roads, and the surrounding conditions. The following detailed description with the related art will allow providing a more comprehensive understanding of various embodiments of the invention and the accompanying advantages thereof will be readily appreciated.

DETAILED DESCRIPTION

The following is a description of specific application of a process of automating the modeling of drainage system that incorporates a sequence of discrete steps detailed in the subsections below. A drainage system may suitably comprise of any, all or any combination of the various drainage components or their equivalents that may or may not be specifically described here in. Therefore, a multitude of combinations and variants of the invention presented here are feasible.

Embodiments of the present invention can be implemented in a BIM based CAD application that supports three dimensional modeling of drainage systems, road networks and other civil structures like roundabout, intersections, bridges, parking, retaining walls and more.

Figure 2:
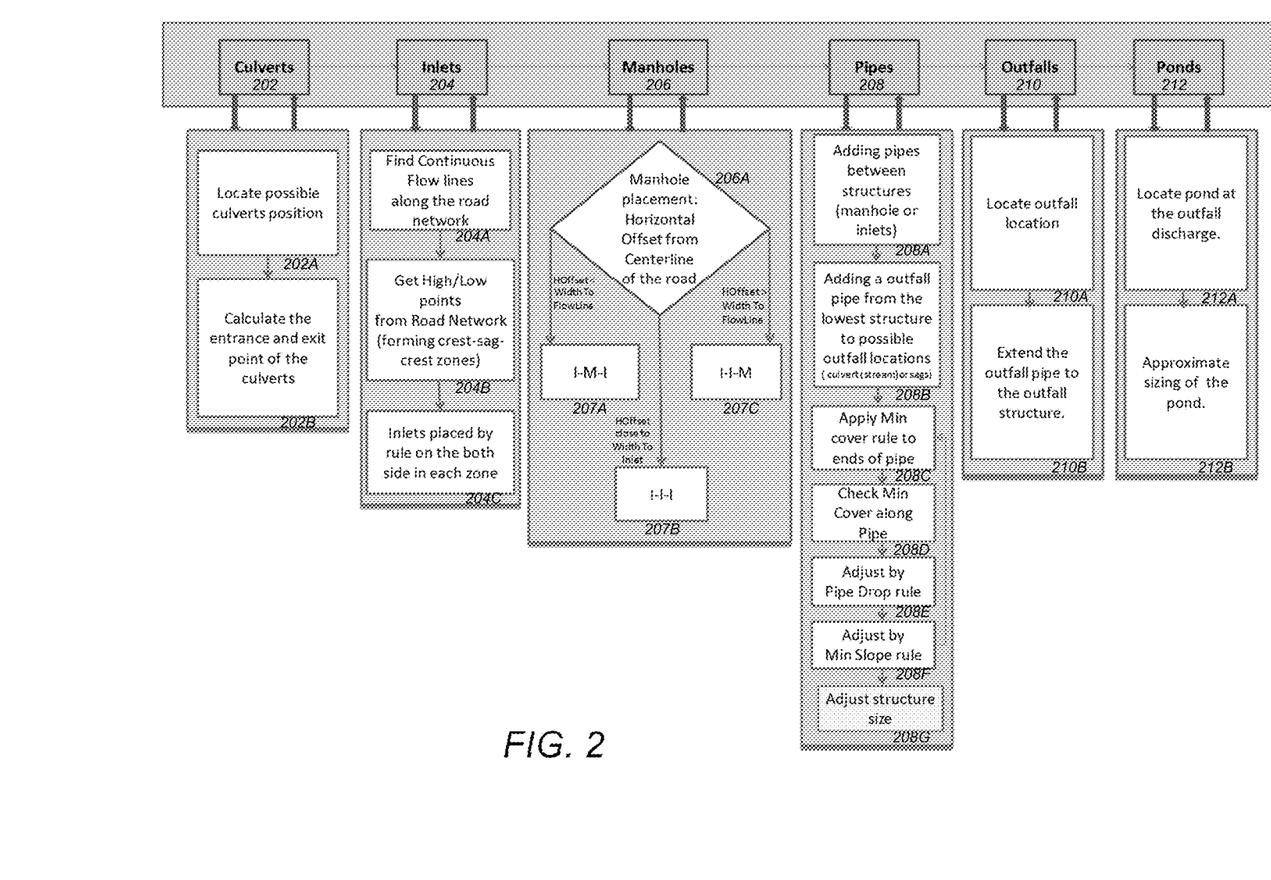
FIG. 2 is the flow diagram illustrating a system or method that automates the design of drainage system along a road network in accordance with one or more embodiments of the invention.

FIG. 2 illustrates the detailed flow diagram of the process of modeling a drainage system in BIM based CAD software in accordance with one or more embodiments of the invention. The flow of FIG. 2 is initiated and performed by drainage system generation process 100. In particular, the drainage system generation process determines and places one or more of the various components 202-212 (culverts 202, inlets 204, manholes 206, pipes 208, outfalls 210, and ponds 212). Beneath each component 202-12, FIG. 2 illustrates the steps utilized to place the respective component.

Culverts 202

Figure 3:
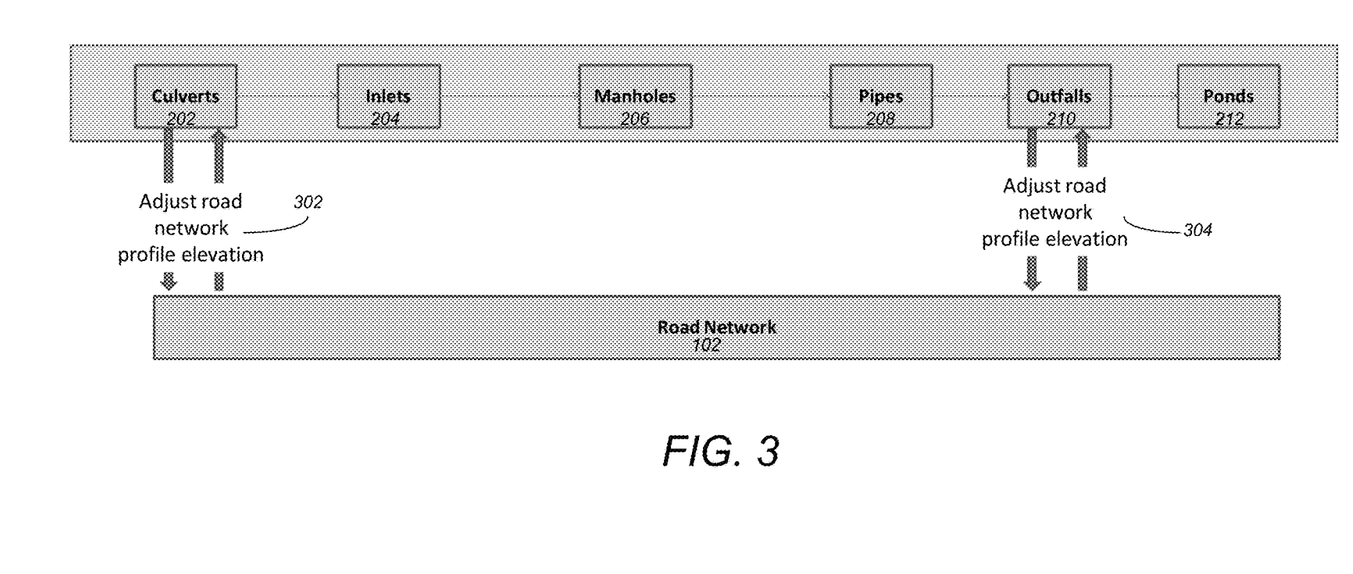
FIG. 3 illustrates the interaction of the drainage system components with the road network in accordance with one or more embodiments of the invention.

Culvert locations and geometry may be identified/designed at 202 (followed by the placement of the culvert at the culvert location). This is achieved by locating the points at which the road intersects water bodies (i.e., locating possible culvert positions 202A). As an example, step 202A identifies where rivers and streams may cross the roadway while identifying the elevation for each crossing. As used herein, the location where the river and stream objects cross the roadway are referred to as a crossing point. Once all the crossing points are identified, a culvert may be placed at every crossing point (thereby creating a "culvert crossing point"). The two ends of each culvert are calculated based on the daylight line (and crossing point) along the side slopes of the road network (i.e., calculating the entrance and exit point of the culverts 202B). In other words, the road grade at each crossing point is examined and the points where the road grade intersects with the rivers/stream become the entrance and exist points of the culverts at 202B. The type of culvert that the model will place may be user configurable. If the clearance between the road and culvert is insufficient, the road profile may be adjusted (as illustrated in FIG. 3, discussed in further detail below).

Inlets 204

At 204, inlet locations along the curbs of the road network may be identified (followed by the placement of the inlets at such inlet locations). In the prior art, the user would have to manually inspect the model to identify the curblines or flowlines (both words can be used interchangeably) along the road to place the inlets manually. However, embodiments of the present invention find the flowlines (e.g., along a road in the road network), identify the high and low points along the road, and calculate the inlet locations based on user configurable inlet spacing (as well as the high points and low points). The type and size of inlets may also be user configurable. In view of the above, inlets are placed based on how the road is modeled—information about where the water is flowing with respect to the road is known. As a result, commonly, inlets are placed at the curbs and not some other location.

More specifically, part of the road model definition identifies where the flow of water is going to be with respect to the road (e.g., the curb/flow line). However, the curb/flow line may change along the roadway. Thus, at 204A, a determination is made regarding where the curb/flow line follows the roadway (i.e., find continuous flowlines along the road network).

At 204B, the roadway is examined to determine the locations of the high and low points (e.g., forming crest-sag-crest zones). Such a determination is needed to space inlets starting at the high point and progressing to the low points. The inlet placement may be spaced to provide multiple high points and low points along the roadway. One may imagine a rollercoaster going up and down with sections between high points—sections may be between the different peaks, and in each section, inlets may be based on the user settings. Thus, at 204C, inlets are placed by rule on both sides in each zone.

Manholes 206

Manholes 206 are placed relative to the road's centerline and the positions of inlets calculated in 204. The two offsets (on which manhole placement is based) are defined as:

a. Horizontal Offset—distance from the road centerline (i.e., the distance between the manhole to be placed and the road centerline) (also referred to as centerline offset); and b. Downstream offset—distance between an inlet/inlet location and adjacent manhole.

Figure 4:
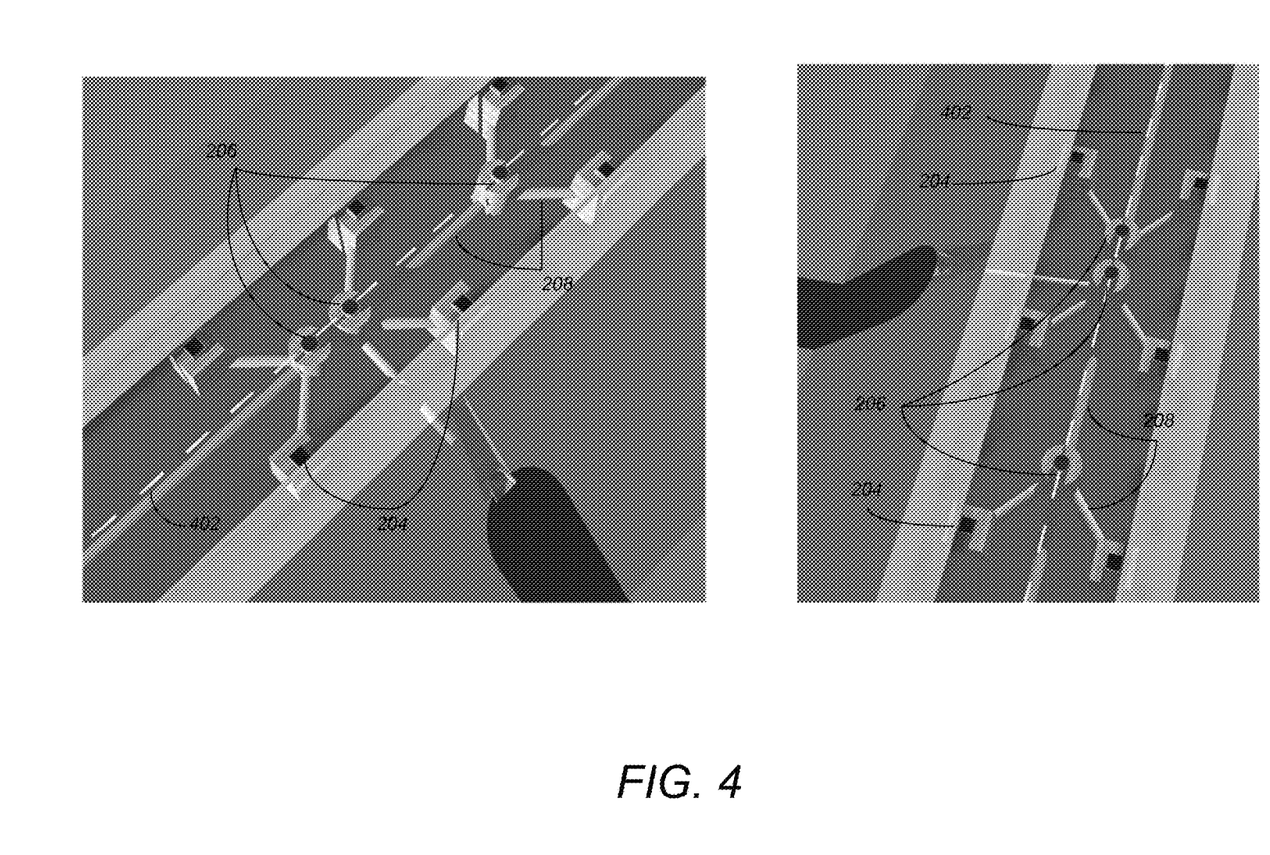
FIG. 4 is an example of a use case according to an embodiment of the present invention illustrating a configuration of the drainage system in accordance with one or more embodiments of the invention.
Figure 5:
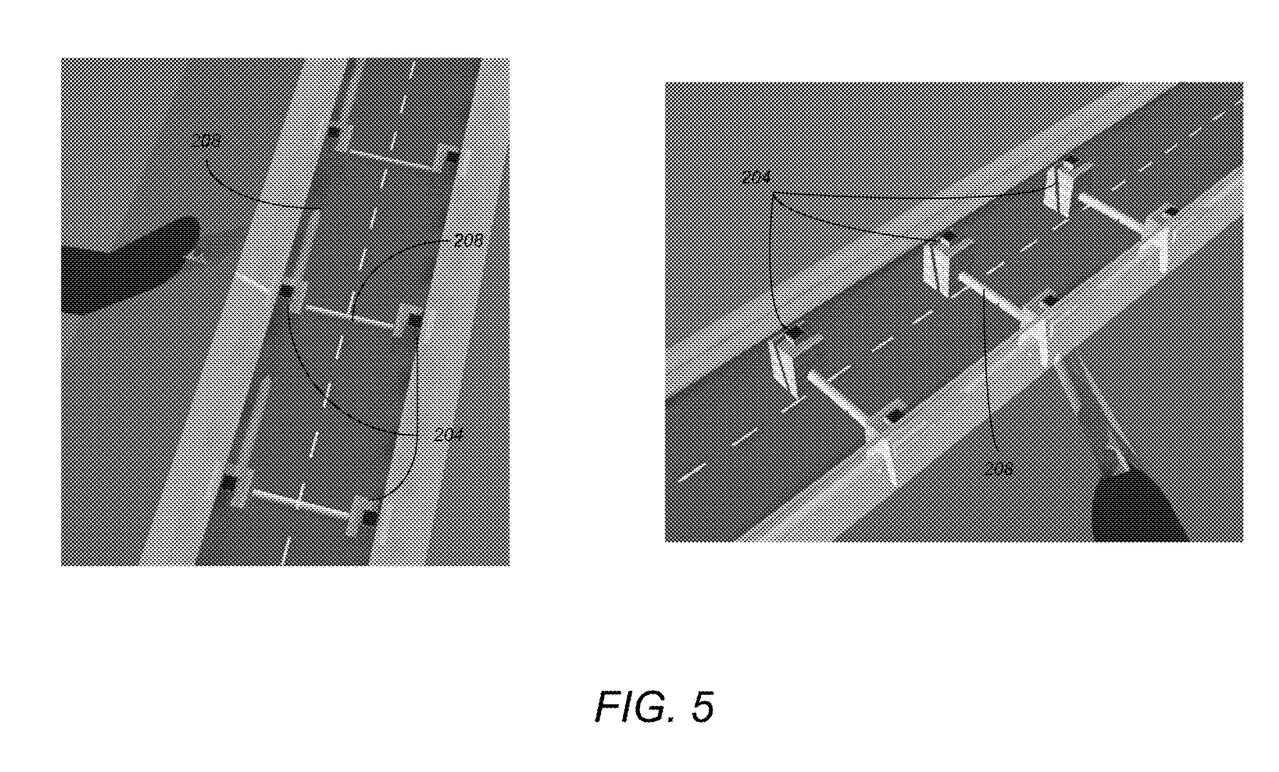
FIG. 5 is an example of a use case according to an embodiment of the present invention illustrating a configuration of the drainage system in accordance with one or more embodiments of the invention.
Figure 6:
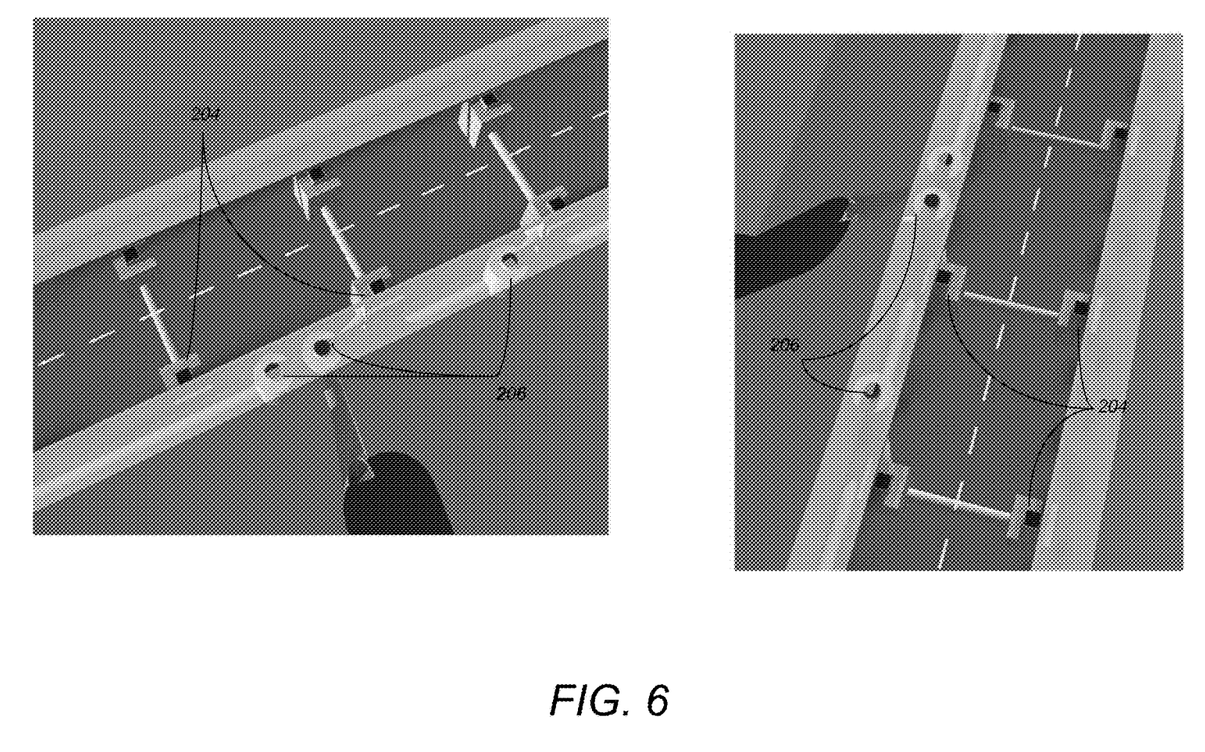
FIG. 6 is an example of a use case according to an embodiment of the present invention illustrating a configuration of the drainage system in accordance with one or more embodiments of the invention.

The offsets are user configurable and govern the configuration of the drainage network in that specific region of the road network. A comparison is made at step 206A comparing the horizontal offset and the width/distance from the centerline (of a road) to the flow/curb line. Based on the comparison a configuration pattern for identifying the manhole/manhole location is selected. Embodiments of the invention allow for three configurations that are illustrated by 207A, 207B and 207C. FIG. 4, FIG. 5, and FIG. 6 show how the different configurations would appear in the model respectively. The different configurations are based on a rule that specifies the centerline/horizontal offset. As the inlets 204 are usually placed along the side of the road (i.e., at the curb), depending on the width of the road, certain offsets may place the manholes 206 outside of the inlets 204, while other offsets may place the manholes 206 inside of the inlets 204. The different configurations 207A, 207B, and 207C provide the different options for manhole 206 placement.

When the horizontal offset falls short of the flow line (i.e., the horizontal offset is less than the width/distance from the center line to the continuous flowline), the pattern at 207A is followed (inlet-manhole-inlet [I-M-I]) as illustrated in FIG. 4. In FIG. 4, the manholes 206 may be placed over the center line 402 (and/or within the inlets 204) and pipes 208 are used to join an inlet 204—to a manhole 206—to another inlet 204.

When the horizontal offset falls close to flow line (i.e., the horizontal offset is close to and/or within a threshold width/distance of the center line to the flowline/inlet), the pattern at 207B is followed (inlet-inlet-inlet [I-I-I]). As illustrated in FIG. 5, there is no need for manholes 206 and pipes 208 may directly connect one inlet 204 to another inlet 204.

When the horizontal offset falls outside the flow line (i.e., the horizontal offset is greater than the width/distance from the center line to the flowline) (e.g., the offset places the manholes 206 outside of the inlets 204), the pattern at 207C is followed (inlet-inlet-manhole [I-I-M]. As illustrated in FIG. 6, the manholes 206 are placed at the designated offset from the centerline (which may place them along or outside the road edge and/or curb) and connect to an inlet 204 that is in turn connected to another inlet 204.

Figure 7:
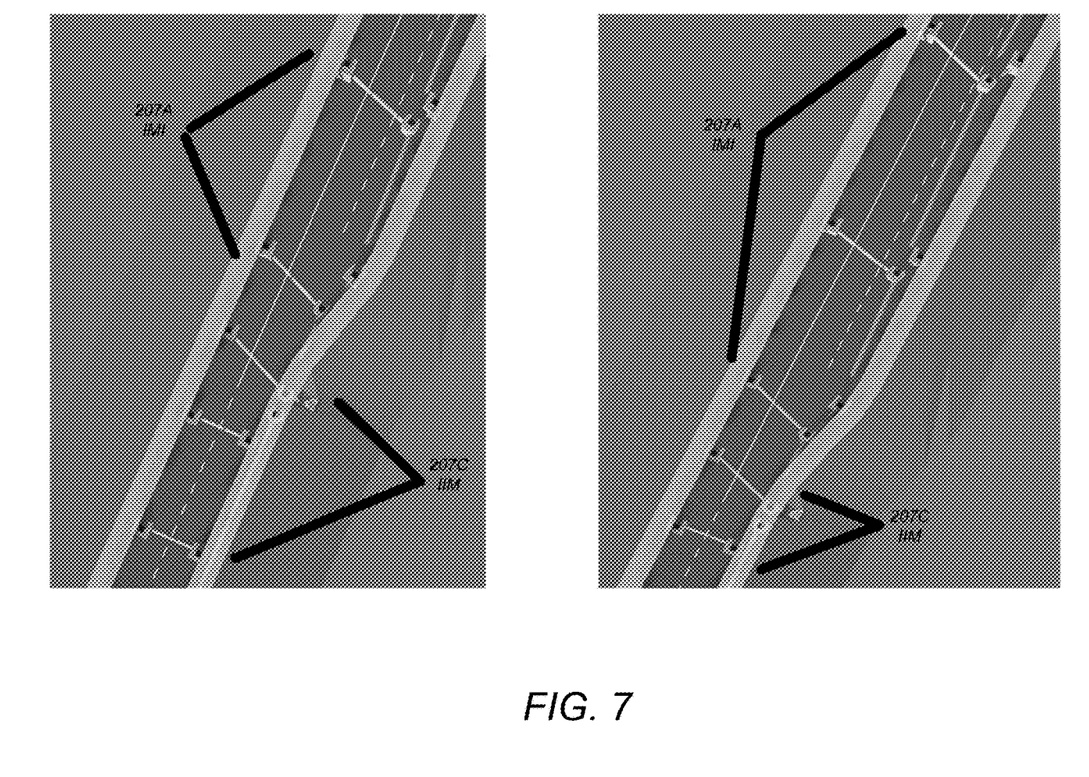
FIG. 7 is an example of a use case according to an embodiment of the present invention illustrating the changing configuration of the drainage system with the road network geometry in accordance with one or more embodiments of the invention.

In view of the above, the configuration of the drainage system at any point along the road network is a function of the configured offsets in the rules and the width of the road at that point on the road network as illustrated in FIG. 7. In particular, with a narrow width road (e.g., the lower portion of the roads illustrated in FIG. 7), the IIM pattern of 207C may be used. In this regard, the user configured offset from the center line is greater than the width/distance from the centerline to the flowline (i.e., the offset is greater than the width of the road) and as a result, the manholes 206 are placed outside of the inlets 204. As the road width increases (as illustrated in the upper portions of the road in FIG. 7), the user configured offset from the center line is less than the width/distance from the centerline to the flowline, therefore requiring the manholes 206 to be placed inside/in between the inlets 204 using the IMI pattern of 207A.

Figure 8:
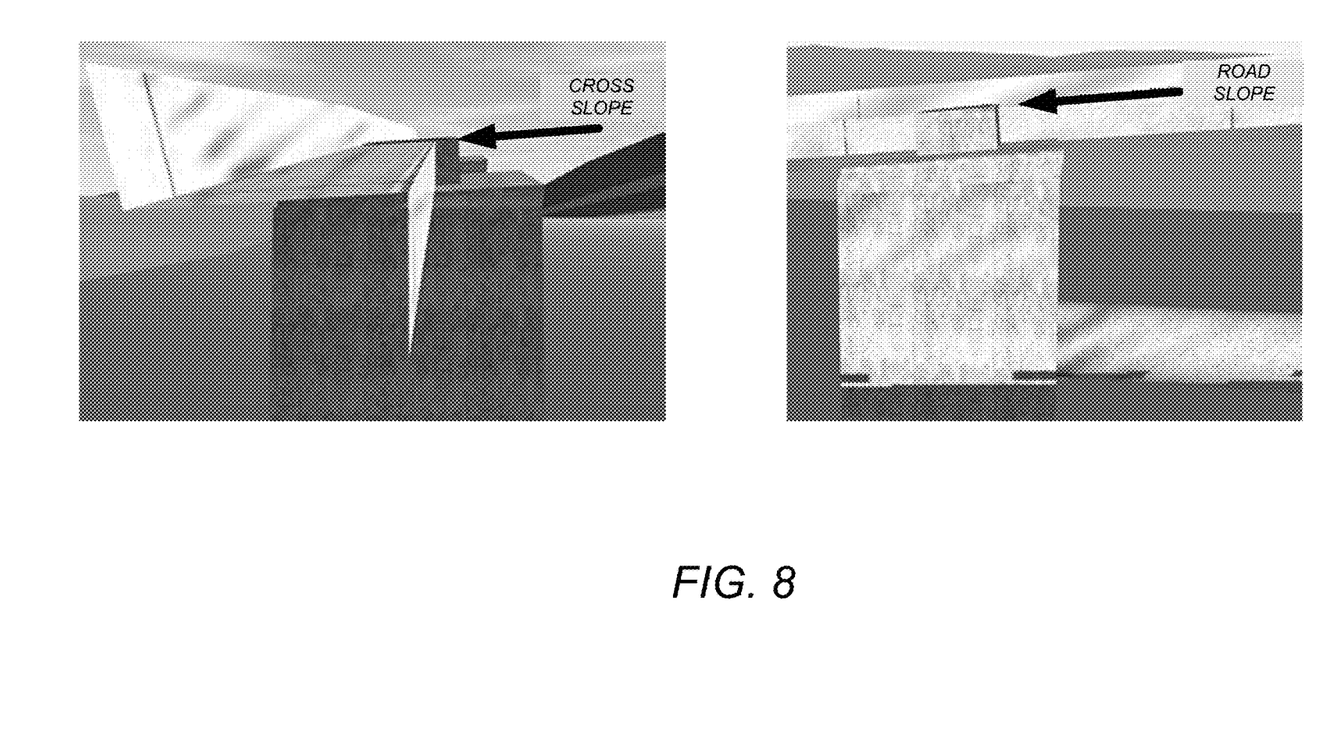
FIG. 8 is an example of a use case according to an embodiment of the present invention illustrating the sloped tops of the inlets and manholes in accordance with the road's slope in accordance with one or more embodiments of the invention.

The top of the inlets 204 and manholes 206 may be sloped to honor the road's longitudinal and cross slopes as illustrated in FIG. 8. The right side of FIG. 8 illustrates the longitudinal road slope (i.e., the slope along the length of the road). The left side of FIG. 8 illustrates the cross slope (i.e., the slope that is perpendicular to the center line). Thus, FIG. 8 demonstrates that inlets and manholes are also sloped consistent with the road longitudinal and cross slopes.

Pipes 208

Pipes geometries are calculated such that the water can flow from inlets 204 to manholes 206 (as illustrated in 208 in FIG. 2). The pipe end elevations, slopes, and cover are controlled by user configurable settings. As these settings are applied to the model, the height of inlets 204 and manholes 206 are dynamically and automatically adjusted (e.g., in real-time). In the prior art, a user would have to manually connect the model—one click at a time. In view of the above, pipes 208 are not just connecting inlets 204 and manholes 206 but also complying with user-defined rules (e.g., slope and cover) that may provide/define minimum/maximum depth and elevation values to ensure sufficient cover (i.e., minimum depth beneath the ground surface) and slope between structures.

At step 208A, pipes 208 are first added between structures (e.g., manhole 206 or inlets 204), followed at step 208B by the addition of an outfall pipe from the lowest structure to a possible/potential outfall location/structure (e.g., culvert, stream or sags). Thereafter, in steps 208C-208G, various rules (e.g., user-defined rules) may be applied to the pipe runs. Such rules may be based on regulations, best engineering practices, and/or user preferences. At step 208C, a minimum cover rule is applied to the end of the pipe, and at step 208D checks are conducted for the minimum cover along the pipe. At step 208E, the pipe drop may be adjusted to ensure compliance with the minimum cover rule. At step 208F, the pipe 208 may also be adjusted to conform with a minimum slope requirement. Lastly, at step 208G, the structure size (e.g., the size of the pipe) may also be adjusted (e.g., to ensure compliance with the desired flow velocity).

Outfalls 210 and Ponds 212

At step 210 of FIG. 2, outfall locations are identified/placed (i.e., at step 210A). Once an outfall location has been identified at step 210A, pipes 208 are placed/extended from the manhole/inlet location to the outfall spot/location at step 210B. Generally, the outfalls 210 are placed at the low points along the road network. In this regard, in one or more embodiments of the invention, both sides of a road may be examined and the side of the road with the lowest terrain is selected for the outfall location. Embodiments of the invention however are suggestively proficient in handling some exceptions based on the surrounding conditions. An example of such exceptions is an existing pond 212 in close proximity to the proposed outfall location. In such a situation, embodiments of the invention take the pond into account and rather than placing the outfall structure at a low point along the road network, the outfall structured is placed such that it feeds the pond (e.g., instead of the low point). Thereafter, the sizing of the pond is automatically approximated in order to satisfy the expected flow.

Figure 9:
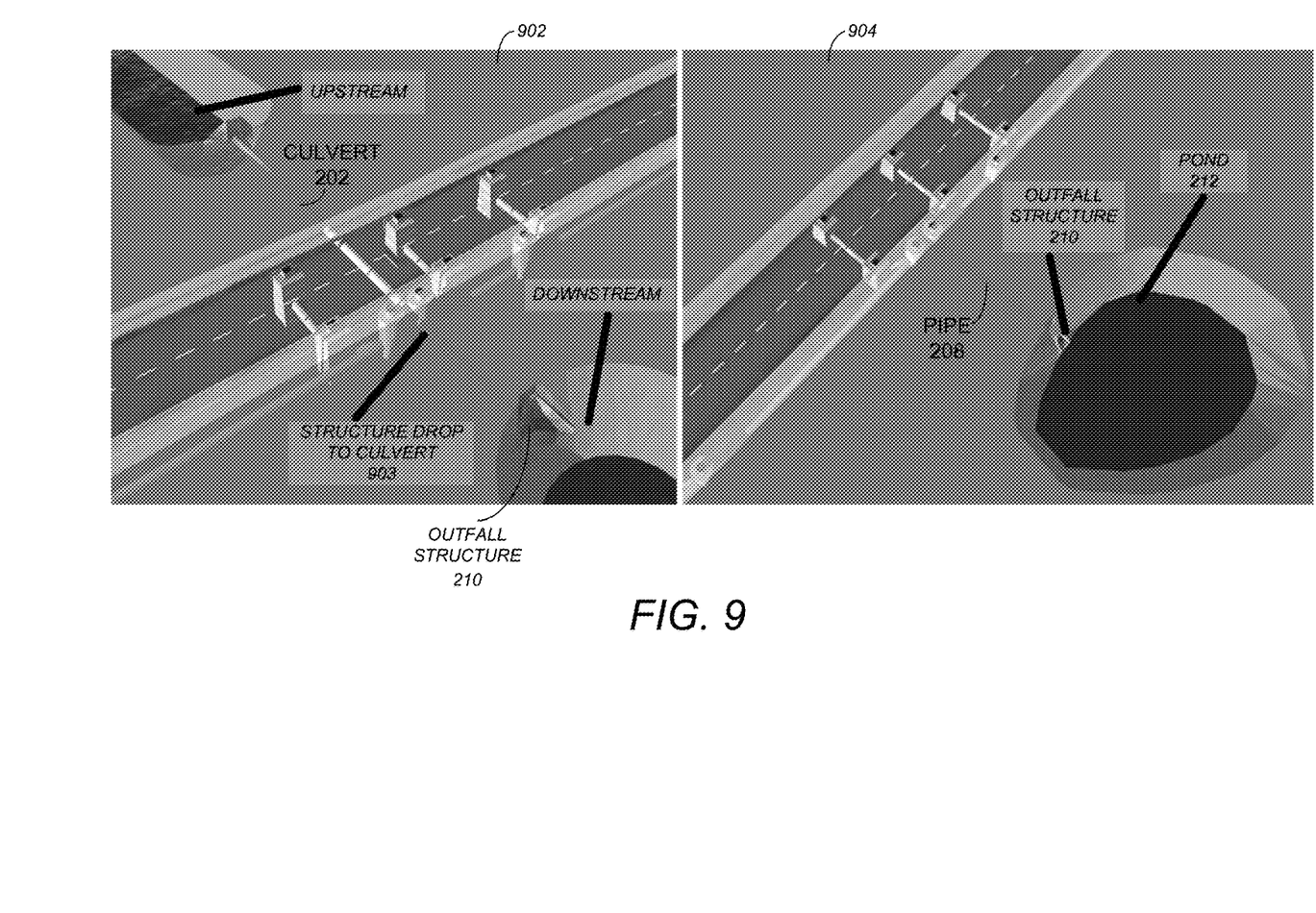
FIG. 9 is an example of a use case according to an embodiment of the present invention illustrating the different configurations of the drainage system feeding the pond or culvert in accordance with one or more embodiments of the invention.

Another example of an exception is the case when the road network profile is such that it has multiple low points close together. The drainage system in such a case is optimized to have fewer outfalls. Further, consider the case where there is a culvert 202 along the drainage system. The outfall 210 in close vicinity of the culvert 202 may be moved to a location to route water to the culvert 202. These examples are illustrated in FIG. 9. In 902, there is an existing culvert 202 under the road and the outfall structure 210 may be dropped to meet the culvert (as illustrated at 903. In 904, a new pipe 208 and outfall 210 are used because there is no existing culvert that the outfall structure 210 needs to meet with.

Referring again to FIG. 3, drainage components 202-212 may update the road network profile or may require adjustments to the road network profile/elevation due. For example, a roadway may be required to pass over a culvert 202 at a certain distance. Consequently, as culverts 202 are placed along a roadway (including the elevations of such culverts 202), the road/road profile may be adjusted (at step 302) to provide sufficient clearance between the road and the culvert 202 (e.g., a certain size culvert). Similarly, if the clearance between a road and outfall 210 is insufficient to accommodate a certain outfall size, the road profile may be adjusted at step 304. Thus, embodiments of the invention provide the ability to modify individual drainage components 202-212 without the need to adjust all downstream components of the drainage system. In the prior art, modifying a drainage component 202-212 would either not cascade to the downstream components, or cascade only partially, or would require manual recognition of any issues and the manual adjustment of the road profile to accommodate any culvert/outfall. Thus, embodiments of the invention provide that any change to the road network 102 geometry can trigger the drainage system to act in response to the road network change and self-adjust (i.e., adjust the road profile so that the road can pass over the culvert/outfall at 302 and 304).

Hardware Embodiments

Figure 10:
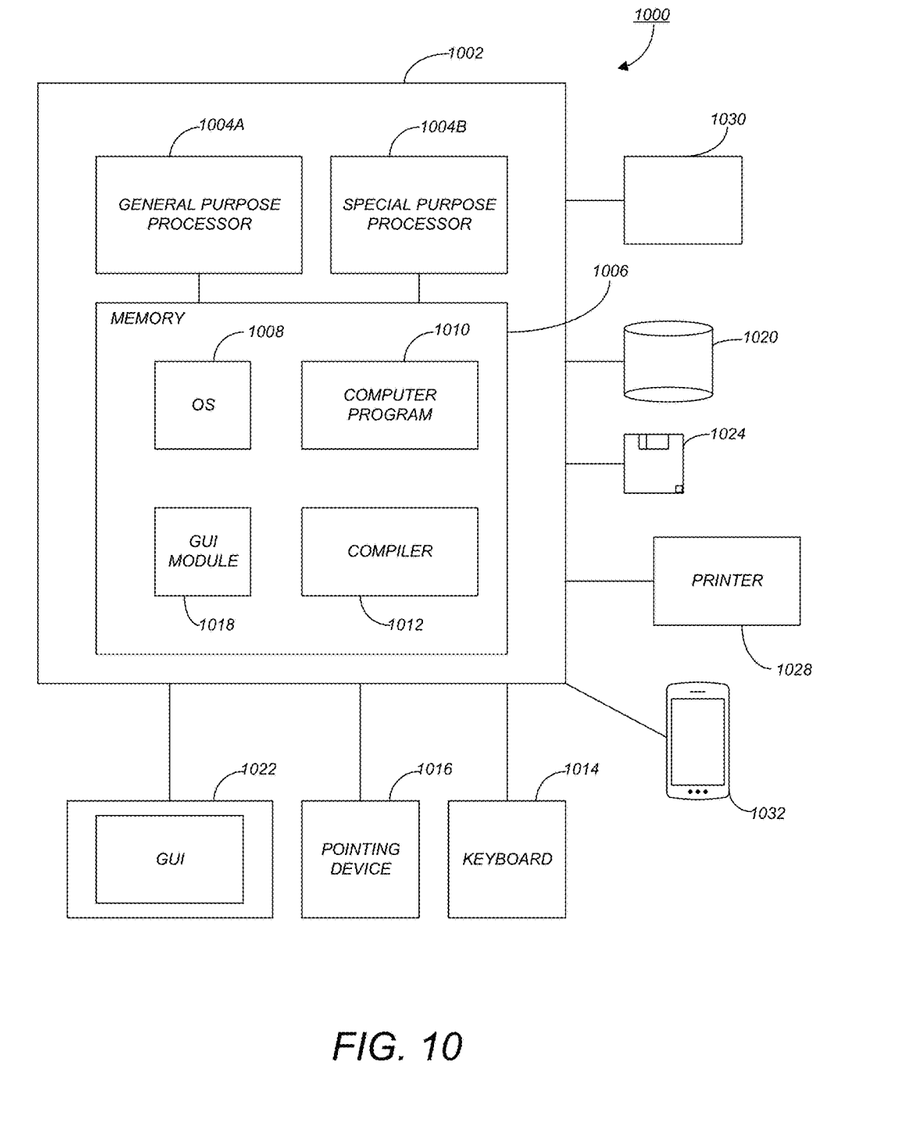
FIG. 10 is an exemplary hardware and software environment used to implement one or more embodiments of the invention.

FIG. 10 is an exemplary hardware and software environment 1000 used to implement one or more embodiments of the invention. The hardware and software environment includes a computer 1002 and may include peripherals. Computer 1002 may be a user/client computer, server computer, or may be a database computer. The computer 1002 comprises a general purpose hardware processor 1004A and/or a special purpose hardware processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028. In one or more embodiments, computer 1002 may be coupled to, or may comprise, a portable or media viewing/listening device 1032 (e.g., an MP3 player, IPOD™, NOOK™, portable digital video player, cellular device, personal digital assistant, etc.). In yet another embodiment, the computer 1002 may comprise a multi-touch device, mobile phone, gaming system, internet enabled television, television set top box, or other internet enabled device executing on various platforms and operating systems.

In one embodiment, the computer 1002 operates by the general purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results.

Output/results may be presented on the display 1022 or provided to another device for presentation or further processing or action. In one embodiment, the display 1022 comprises a liquid crystal display (LCD) having a plurality of separately addressable liquid crystals. Alternatively, the display 1022 may comprise a light emitting diode (LED) display having clusters of red, green and blue diodes driven together to form full-color pixels. Each liquid crystal or pixel of the display 1022 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 PLAYERS, NINTENDO 3DS™, PLAYSTATION PORTABLE™, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, the some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC).

The computer 1002 may also implement a compiler 1012 that allows an application or computer program 1010 written in a programming language such as C, C++, ASSEMBLY, SQL, PYTHON, PROLOG, MATLAB, RUBY, RAILS, HASKELL, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as JAVA™ JAVASCRIPT™, PERL™, BASIC™, etc. After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1002.

Figure 11:
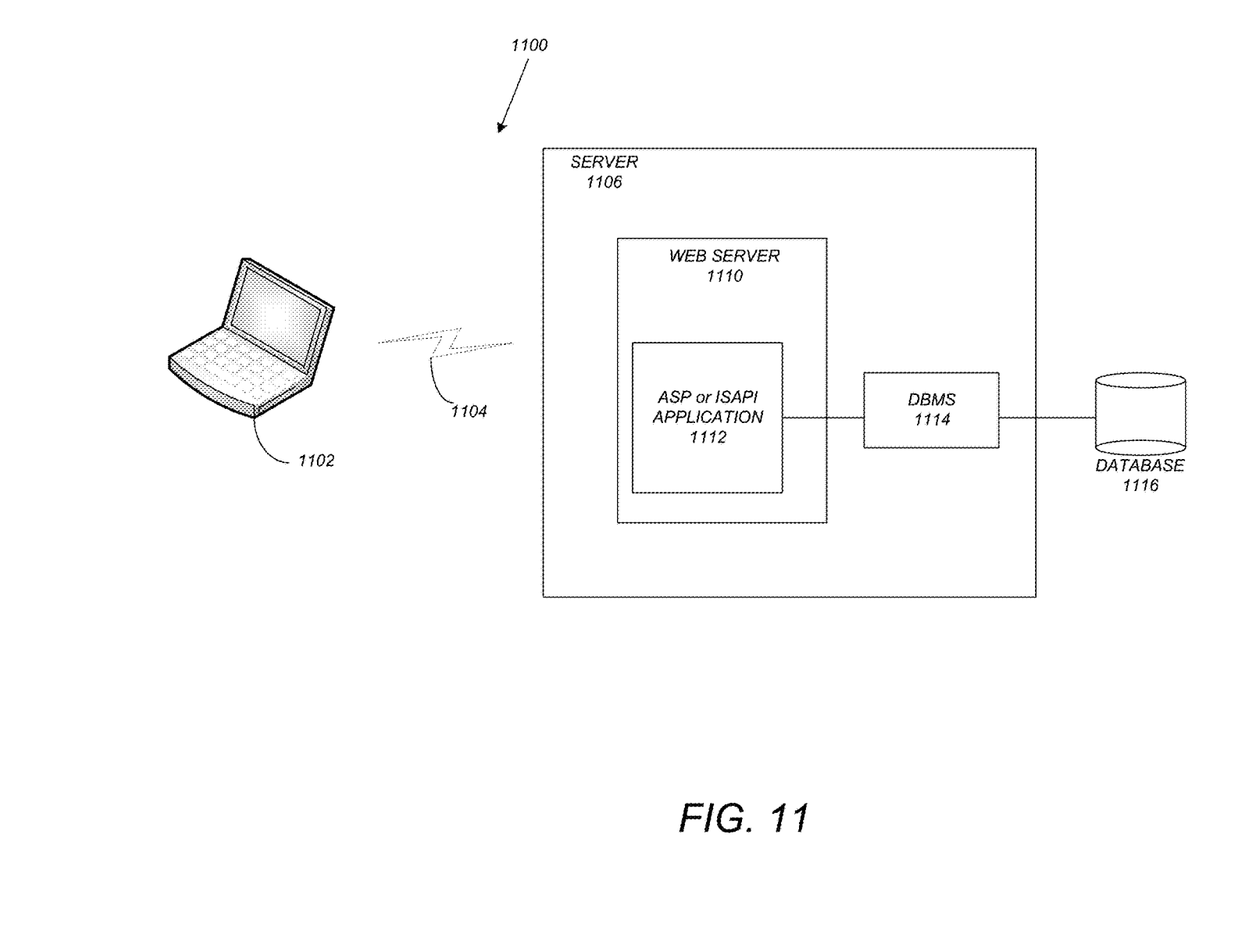
FIG. 11 schematically illustrates a typical distributed computer system using a network to connect client computers to server computers in accordance with one or more embodiments of the invention.

FIG. 11 schematically illustrates a typical distributed computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Clients 1102 may execute a client application or web browser and communicate with server computers 1106 executing web servers 1110. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 1102 may be downloaded from server computer 1106 to client computers 1102 and installed as a plug-in or ACTIVEX™ control of a web browser. Accordingly, clients 1102 may utilize ACTIVEX™ components/component object model (COM) or distributed COM (DCOM) components to provide a user interface on a display of client 1102. The web server 1110 is typically a program such as MICROSOFT'S INTERNET INFORMATION SERVER™.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S™ Transaction Server (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1102 and 1106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1102 and 1106. Embodiments of the invention are implemented as a software application on a client 1102 or server computer 1106. Further, as described above, the client 1102 or server computer 1106 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to design a drainage system by leveraging data in a unique manner. In particular, drainage network settings are combined with information about a modeled road to place a drainage system that is a potentially viable solution without the user performing anything more than asking the system to show/create a network drainage system. Embodiments of the invention examine a road model and determine the best location for placing inlets, manholes, and outfalls, determines how deep to place the outfall, whether or not to raise the road to accommodate the drainage system, etc.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for defining and generating a drainage system along a road network in a building information model (BIM) computer aided design (CAD) three dimensional (3D) model, comprising:
   acquiring, in a computer, the road network in the BIM CAD 3D model, wherein the road network comprises a network of roads, geometry of the roads, centerlines for the roads, curbs along the roads, and surrounding conditions;
   acquiring, in the computer, one or more user configurable rules and settings for automated determination of and placement of drainage components along the roads in the road network; and
   applying, in the computer, the rules/settings to the road network to automatically design and define the drainage system, wherein:
   the drainage system comprises multiple drainage system components that are automatically determined and placed along the roads in the road network without additional user input;
   a first drainage system component of the multiple drainage system components affects a location and a placement of a second drainage system component of the multiple drainage system components;
   the drainage system is based on the geometry of the road network, the centerlines for the roads, the curbs along the roads, and the surrounding conditions; and
   the drainage system is automatically designed dynamically without additional user input.

2. The computer-implemented method of claim 1, wherein the multiple drainage system components are placed in a sequential order comprising:
   culverts;
   inlets;
   manholes;
   pipes;
   outfalls; and
   ponds.

3. The computer-implemented method of claim 1, wherein the applying comprises:
   locating a crossing point at which one of the roads in the road network intersects a body of water;
   calculating an entrance point and an exit point of a culvert based on the crossing point; and
   placing the culvert based on the entrance point and the exit point.

4. The computer-implemented method of claim 3, wherein the applying further comprises:
   determining that a road network clearance is insufficient to accommodate a certain culvert size; and
   based on the determining, adjusting a profile of one of the roads to accommodate the certain culvert size.

5. The computer-implemented method of claim 1, wherein the applying comprises:

finding a continuous flow line along a first road in the road network;
identifying one or more high points and one or more low points of the first road;
calculating an inlet location based on user configurable inlet spacing, the continuous flow line, the one or more high points and the one or more low points; and
placing an inlet at the inlet location.

6. The computer-implemented method of claim 5, wherein:
(a) a manhole location, for a manhole, is identified relative to the inlet location and the centerline for the first road;
(b) the applying comprises:
(1) determining a horizontal offset comprising a distance from the centerline for the first road, wherein the horizontal offset is user configurable;
(2) determining a downstream offset comprising a distance between the inlet location and the manhole, wherein the downstream offset is user configurable;
(3) comparing the horizontal offset to a distance from the centerline, for the first road, to the continuous flow line;
(4) selecting, based on the comparing, one configuration pattern for identifying the manhole, wherein:
(i) when the horizontal offset is less than the distance from the centerline to the continuous flow line, the configuration pattern comprises inlet-manhole-inlet, wherein the manhole is placed between a first inlet and a second inlet, and one or more pipes are used to join the first inlet to the manhole and the manhole to a second inlet;
(ii) when the horizontal offset is within a threshold distance from the centerline to the continuous flow line, the configuration pattern comprises inlet-inlet-inlet, wherein no manhole is placed and one or more pipes are used to connect the first inlet to the second inlet; and
(iii) when the horizontal offset is greater than the distance from the centerline to the continuous flow line, the configuration pattern comprises inlet-inlet-manhole, wherein the manhole is placed at the horizontal offset from the centerline, the manhole is connected to the first inlet, and the first inlet is connected to the second inlet.

7. The computer-implemented method of claim 6, wherein:
pipe end elevations, pipe slopes, and cover for the one or more pipes are user configurable settings;
as the pipe end elevations, pipe slopes, and cover are applied to the building information model, a height of the inlet and the manhole are dynamically and automatically adjusted.

8. The computer-implemented method of claim 6, wherein the applying further comprises:
adding an outfall pipe from a lowest of one or more structures to a potential outfall location;
applying a minimum cover rule to ends of the one or more pipes;
determining whether the minimum cover rule has been complied with along the one or more pipes;
when the minimum cover rule has not been complied with, adjusting a pipe drop to ensure compliance;
adjusting the one or more pipes to conform with a minimum slope requirement; and
adjusting a size of the one or more pipes to provide a desired flow velocity.

9. The computer-implemented method of claim 8, wherein the applying the rules/settings to the road network further comprises:
at the potential outfall location, extending the outfall pipe to an outfall structure.

10. The computer-implemented method of claim 9, wherein the applying the rules/settings to the road network further comprises:
determining that a pond is within a threshold distance of the potential outfall location;
based on the determining that the pond is within the threshold distance, rather than the placing the outfall structure at a low point along the road network, placing the outfall structure feeding the pond; and
approximating the sizing of the pond.

11. The computer-implemented method of claim 9, wherein the applying the rules/settings to the road network further comprises:
determining that a clearance between the road and the outfall structure is insufficient to accommodate a size of the outfall structure; and
adjusting a profile of the road network to provide sufficient clearance.

12. A computer system for defining and generating a drainage system along a road network in a building information model (BIM) computer aided design (CAD) three dimensional (3D) model comprising:
(a) a computer having a memory; and
(b) a drainage system generation application executing on the computer, wherein the drainage system generation application:
(1) acquires the road network in the BIM CAD 3D model, wherein the road network comprises a network of roads, geometry of the roads, centerlines for the roads, curbs along the roads, and surrounding conditions;
(2) acquires one or more user configurable rules and settings for automated determination of and placement of drainage components along the roads in the road network; and
(3) applies the rules/settings to the road network to automatically design and define the drainage system, wherein:
(i) the drainage system comprises multiple drainage system components that are automatically determined and placed along the roads in the road network without additional user input;
(ii) a first drainage system component of the multiple drainage system components affects a location and a placement of a second drainage system component of the multiple drainage system components;
(iii) the drainage system is based on the geometry of the road network, the centerlines for the roads, the curbs along the roads, and the surrounding conditions; and
(iv) the drainage system is automatically designed dynamically without additional user input.

13. The computer system of claim 12, wherein the multiple drainage system components are placed in a sequential order comprising:
culverts;
inlets;
manholes;
pipes;
outfalls; and
ponds.

14. The computer system of claim 12, wherein the drainage system generation application:
  locates a crossing point at which one of the roads in the road network intersects a body of water;
  calculates an entrance point and an exit point of a culvert based on the crossing point;
  places the culvert based on the entrance point and the exit point.

15. The computer system of claim 14, wherein the drainage system generation application:
  determines that a road network clearance is insufficient to accommodate a certain culvert size;
  based on the determination, adjusts a profile of one of the roads to accommodate the certain culvert size.

16. The computer system of claim 12, wherein the drainage system generation application:
  finds a continuous flow line along a first road in the road network;
  identifies one or more high points and one or more low points of the first road;
  calculates an inlet location based on user configurable inlet spacing, the continuous flow line, the one or more high points and the one or more low points; and
  places an inlet at the inlet location.

17. The computer system of claim 16, wherein:
  (a) a manhole location, for a manhole, is identified relative to the inlet location and the centerline for the first road;
  (b) the drainage system generation application:
    (1) determines a horizontal offset comprising a distance from the centerline for the first road, wherein the horizontal offset is user configurable;
    (2) determines a downstream offset comprising a distance between the inlet location and the manhole, wherein the downstream offset is user configurable;
    (3) compares the horizontal offset to a distance from the centerline, for the first road, to the continuous flow line;
    (4) selects, based on the comparison, one configuration pattern for identifying the manhole, wherein:
      (i) when the horizontal offset is less than the distance from the centerline to the continuous flow line, the configuration pattern comprises inlet-manhole-inlet, wherein the manhole is placed between a first inlet and a second inlet, and one or more pipes are used to join the first inlet to the manhole and the manhole to a second inlet;
      (ii) when the horizontal offset is within a threshold distance from the centerline to the continuous flow line, the configuration pattern comprises inlet-inlet, wherein no manhole is placed and one or more pipes are used to connect the first inlet to the second inlet; and
      (iii) when the horizontal offset is greater than the distance from the centerline to the continuous flow line, the configuration pattern comprises inlet-inlet-manhole, wherein the manhole is placed at the horizontal offset from the centerline, the manhole is connected to the first inlet, and the first inlet is connected to the second inlet.

18. The computer system of claim 17, wherein:
  pipe end elevations, pipe slopes, and cover for the one or more pipes are user configurable settings; and
  as the pipe end elevations, pipe slopes, and cover are applied to the building information model, a height of the inlet and the manhole are dynamically and automatically adjusted.

19. The computer system of claim 17, wherein the drainage system generation application:
  adds an outfall pipe from a lowest of one or more structures to a potential outfall location;
  applies a minimum cover rule to ends of the one or more pipes;
  determines whether the minimum cover rule has been complied with along the one or more pipes;
  when the minimum cover rule has not been complied with, adjusts a pipe drop to ensure compliance;
  adjusts the one or more pipes to conform with a minimum slope requirement; and
  adjusts a size of the one or more pipes to provide a desired flow velocity.

20. The computer system of claim 19, wherein the drainage system generation application:
  extends, at the potential outfall location, the outfall pipe to an outfall structure.

21. The computer system of claim 20, wherein the at the potential outfall location:
  determines that a pond is within a threshold distance of the potential outfall location;
  based on the determination that the pond is within the threshold distance, rather than the placing the outfall structure at a low point along the road network, places the outfall structure feeding the pond; and
  approximates the sizing of the pond.

22. The computer system of claim 20, wherein the at the potential outfall location:
  determines that a clearance between the road and the outfall structure is insufficient to accommodate a size of the outfall structure; and
  adjusts a profile of the road network to provide sufficient clearance.

* * * * *